United States Patent [19]

Frankenberg

[11] 4,192,453
[45] Mar. 11, 1980

[54] THERMOSTAT CONSTRUCTION AND METHOD OF MAKING THE SAME

[75] Inventor: Alfred A. Frankenberg, Knoxville, Tenn.

[73] Assignee: Robertshaw Controls Company, Richmond, Va.

[21] Appl. No.: 864,674

[22] Filed: Dec. 27, 1977

[51] Int. Cl.² ............................................. G05D 23/08
[52] U.S. Cl. ........................................ 236/87; 137/85; 236/51
[58] Field of Search ................. 236/86, 87, 51; 137/85

[56] References Cited

U.S. PATENT DOCUMENTS

| | | | |
|---|---|---|---|
| 3,052,254 | 9/1962 | Parks | 137/85 |
| 3,165,262 | 1/1965 | Ollivier | 137/85 X |
| 3,263,925 | 8/1966 | Joesting | 236/87 X |
| 3,861,588 | 1/1975 | Bata et al. | 236/87 X |
| 3,871,396 | 3/1975 | Bentsen | 137/85 |

Primary Examiner—William E. Wayner
Assistant Examiner—William E. Tapolcai, Jr.
Attorney, Agent, or Firm—Candor, Candor & Tassone

[57] ABSTRACT

A thermostat construction for producing a pneumatic signal in relation to sensed temperature and having a housing provided with a pneumatically operated set point adjustment diaphragm operatively interconnected to a temperature sensor and a pneumatically operated feedback diaphragm to control a valve unit for producing the pneumatic signal in an output chamber of the housing that is defined in part by the feedback diaphragm, a balancing diaphragm being carried by the housing and also defining in part the output chamber thereof.

18 Claims, 1 Drawing Figure

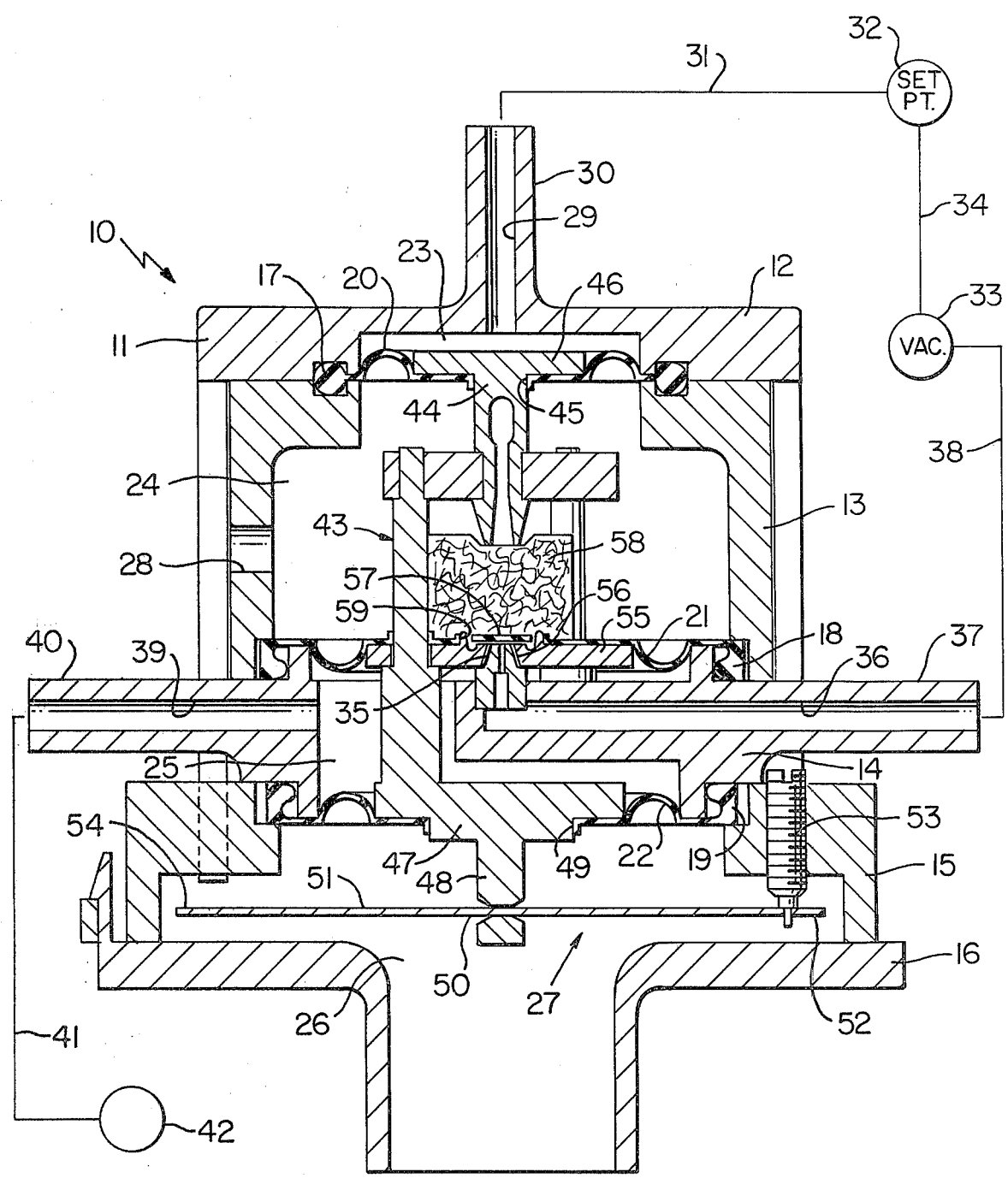

THERMOSTAT CONSTRUCTION AND METHOD OF MAKING THE SAME

BACKGROUND OF THE INVENTION

1. Field of the Invention

This invention relates to an improved pneumatically operated thermostat construction and to a method of making such a thermostat construction or the like.

2. Prior Art Statement

It is known to applicant to provide a thermostat construction for producing a pneumatic signal in relation to sensed temperature and having a housing means provided with a pneumatically operated set point adjustment diaphragm operatively interconnected to a temperature sensor and a pneumatically operated feedback diaphragm to control valve means for producing the pneumatic signal in an output chamber of the housing means that is defined in part by the feedback diaphragm.

For example, see the following item:

(1) Copending patent application Ser. No. 864,455, filed Dec. 27, 1977.

The thermostat construction of item (1) above has only two diaphragms and a temperature sensor operatively interconnected together to operate a valve unit of the thermostat construction, one of the diaphragms being a pneumatically operated set point adjustment diaphragm and the other diaphragm being a pneumatically operated feedback diaphragm that defines in part the output chamber of the thermostat construction.

SUMMARY OF THE INVENTION

It was found according to the teachings of this invention that when the pneumatically operated set point adjustment diaphragm and the temperature sensing bimetal member of the thermostat construction of the aforementioned copending patent application were made small enough to fit a reasonably-sized envelope or housing means, the feedback diaphragm of such a thermostat construction had to be exceptionally small in diameter.

However, experience has proven that it is very difficult to control the mean effective area (MEA) of a small diaphragm because small variations in diaphragm thickness and small variations in diaphragm position caused by variations in parts supporting and engaging the diaphragm result in substantial variations in the mean effective area of the diaphragm so that an intolerable situation is provided if the aforementioned thermostat construction utilized such a small feedback diaphragm and be required to meet high standards of excellence.

Accordingly, it is a feature of this invention to provide such a thermostat construction wherein the small sized feedback diaphragm can be eliminated in order to substantially eliminate the aforementioned problems.

This feature is accomplished by providing a relatively large feedback diaphragm in combination with a relatively large balancing diaphragm.

In particular, one embodiment of this invention provides a thermostat construction for producing a pneumatic signal in relation to sensed temperature and having a housing means provided with a pneumatically operated set point adjustment diaphragm operatively interconnected to a temperature sensor and a pneumatically operated feedback diaphragm to control valve means for producing the pneumatic signal in an output chamber of the housing means that is defined in part by the feedback diaphragm, a balancing diaphragm also being carried by the housing means and also defining in part the output chamber thereof.

In this manner, the mean effective area of the feedback diaphragm is only slightly greater than the mean effective area of the balancing diaphragm so that the net result is a small feedback force in opposition to variations in the force of the temperature sensor caused by changes in sensed temperature once the temperature sensor has been set by the pneumatically operated set point adjustment diaphragm.

Accordingly, it is an object of this invention to provide an improved thermostat construction having one or more of the novel features of this invention as set forth above or hereinafter shown or described.

Another object of this invention is to provide an improved method of making such a thermostat construction or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWING

The FIGURE of the drawing illustrates in cross section the improved thermostat construction of this invention.

DESCRIPTION OF THE PREFERRED EMBODIMENT

While the various features of this invention are hereinafter described and illustrated as being particularly adapted to provide a thermostat construction for a heat exchanger system, it is to be understood that the various features of this invention can be utilized singly or in any combination thereof to provide a thermostat construction for other uses as desired.

Therefore, this invention is not to be limited to only the embodiment illustrated in the drawing, because the drawing is merely utilized to illustrate one of the wide variety of uses for this invention.

Referring now to the drawing, the improved thermostat construction of this invention is generally indicated by the reference 10 and comprises a housing means 11 formed from a plurality of housing parts 12, 13, 14, 15 and 16 arranged in stacked relation and secured together in suitable manner as illustrated to hold outer peripheral portions 17, 18 and 19 of three flexible diaphragms 20, 21 and 22 in the stacked spaced relation illustrated for a purpose hereinafter described.

The diaphragm 20 comprises a pneumatically operated set point adjustment diaphragm, the diaphragm 21 comprising a feedback diaphragm and the diaphragm 22 comprising a balancing diaphragm.

The diaphragms 20-22 cooperate with the housing means 11 to define four chambers 23, 24, 25 and 26 separated from each other with the chamber 26 being opened to the area that is to have the temperature thereof sensed by a temperature sensor 27 that is disposed within the chamber 26 and carried by the housing means 11 in a manner hereinafter set forth.

The chamber 24 is interconnected to the atmosphere by a vent opening 28 in the housing means 11.

The chamber 23 is interconnected to a passage 29 of a nipple 30 of the housing means 11 that is adapted to be interconnected by a conduit means 31 to a set point adjuster 32 which is adapted to direct a pneumatic signal to the chamber 23 of a value that corresponds to a setting of the set point adjuster 32 as fully described and illustrated in the aforementioned copending patent application.

In particular, the set point adjuster 32 is adapted to create a vacuum signal in the chamber 23 that corresponds to a temperature setting of the set point adjuster 32, the set point adjuster 32 being interconnected to a vacuum source 33 by a conduit means 34.

The chamber 25 of the thermostat construction 10 comprises a feedback or output chamber and is adapted to be interconnected to a stationary valve seat 35 carried by the housing part 14 and being disposed in fluid communication with a passage 36 thereof that terminates in a nipple extension 37 of the housing part 14. In this manner, the nipple 37 can be interconnected by a conduit means 38 to the vacuum source 33 for a purpose hereinafter described.

Similarly, the feedback or output chamber 25 is interconnected by a passage 39 that terminates in a nipple extension 40 of the housing part 14 whereby the nipple 40 can be interconnected by a conduit means 41 to a pneumatically operated device 42, such as a pneumatically operated damper positioner for a transportation vehicle heat exchanger system as illustrated and described in the aforementioned copending patent application.

A rigid interconnection means that is generally indicated by the reference numeral 43 is disposed in the housing means 11 and is interconnected to the diaphragms 20–22 so as to cause the diaphragms 20–22 to move in unison therewith as well as be maintained in the stacked spaced relation illustrated in the drawing.

A portion 44 of the interconnection means 43 passes through an opening 45 in the set point adjustment diaphragm 20 to terminate in an enlarged backup plate means 46 for the diaphragm 20.

Similarly, an enlarged portion 47 of the interconnection means 43 forms a backup portion for the balancing diaphragm 22 while another part 48 thereof projects through an opening 49 of the balancing diaphragm 22 to be interconnected to a medial portion 50 of a bimetal member 51 that comprises the temperature sensor 27.

The bimetal member 51 has one end 52 thereof engaged by a threaded adjusting member 53 carried by the housing means 11 while the other end 54 can be disposed in cantilevered fashion as illustrated or can be supported in any suitable manner whereby the natural spring force of the bimetal member 51 tending to pull downwardly in the drawing on the interconnection means 43 will change in accordance with sensed temperature changes as will be apparent hereinafter.

The interconnection means 43 includes an enlarged portion 55 that acts as a backup plate for the feedback diaphragm 21 and has an opening 56 passing therethrough to receive the valve seat 35 therein, the valve seat 35 being adapted to be opened and closed by a resilient valve member 57 movably carried by the interconnection means 43 and normally urged toward a closed position against the opening 56 by a porous compressible filter member 58 carried by the interconnection means 43 in the manner illustrated.

In this manner, the valve member 57 normally tends to close the opening 56 of the member 55 from the feedback chamber 25 as long as the valve seat 35 does not project into the opening 56 a distance sufficient to move the valve member 57 away from the opening 56.

However, when the interconnection means 43 is moved down in the manner hereinafter described to cause the valve seat 35 to project into the opening 56 at a distance sufficient to move the valve member 57 away from the opening 56, the atmosphere in the chamber 24 is adapted to pass through the filter 58, opening 59 in the feedback diaphragm 21 and the now opened opening 56 of the interconnection part 55 to enter the feedback chamber 25 for a purpose hereinafter described. At the same time, the valve member 57 maintains the valve seat member 35 in a closed condition thereof.

The housing parts 13, 14 and 15 and portions 47 and 55 of the interconnection means 43 are so sized relative to each other that the mean effective area (MEA) of the feedback diaphragm 21 that is exposed to pneumatic fluid in the output chamber 25 is only slightly greater than the mean effective area (MEA) of the balancing diaphragm 22 that is exposed to the pneumatic fluid in the output chamber 25 so that the net result of a vacuum being created in the output chamber 25 in a manner hereinafter described is a bias on the interconnection means 43 to tend to move the interconnection means 43 downwardly in the drawing for a purpose hereinafter described.

In particular, the vacuum condition in the chamber 25 creates a pressure differential across the feedback diaphragm 21 that tends to move the interconnection means 43 downwardly while the pressure differential across the balancing diaphragm 22 tends to move the interconnection means 43 upwardly so that the force of the balancing diaphragm 22 is, in effect, substracted from the force of the feedback diaphragm 21.

In this manner, the feedback diaphragm 21 can be a relatively large diaphragm and yet the net biasing force thereof is relatively small so as to duplicate the biasing force when only a small diaphragm is being utilized, such as the small feedback diaphragm of the thermostat construction of the aforementioned copending patent application.

From the above, it can readily be seen that the thermostat construction 10 of this invention can be made by the method of this invention in a relatively simple and economical manner to operate in a manner now to be described.

Assuming that the thermostat construction 10 has the nipples 30 and 37 thereof respectively interconnected to the set point adjuster 32 and the vacuum source 33 while the nipple 40 thereof is interconnected to the pneumatically operated device 42, the setting of the set point adjuster to a particular temperature setting causes the set point adjuster 32 to create a particular vacuum condition in the set point chamber 23 whereby the resulting pressure differential acting across the set point adjustment diaphragm 20 tends to pull the interconnection means 43 upwardly in the drawing and thereby impose a certain temperature setting on the bimetal member 51.

Thus, when the bimetal member 51 is sensing an output temperature effect of the heat exchanger system that corresponds to the temperature that is set by the set point adjuster 32, the particular vacuum condition that has been created in the output chamber 25 of the thermostat construction 10 in a manner hereinafter described has set the positioner 42 to a particular position thereof so that the heat exchange means continues to have its output effect producing the selected temperature that is being sensed by the bimetal member 51.

However, should the temperature being sensed by the bimetal member 51 change to cause the bimetal member 51 to pull downwardly on the interconnection means 43 with a lesser force, such as by the sensed temperature falling a certain amount below the selected temperature, the interconnection means 43 will move upwardly through the bias of the pressure differential acting across the set point adjustment diaphragm 20 to thereby carry the portion 55 upwardly so that the valve member 57 is moved away from the valve seat 35 to permit the vacuum source 33 to be interconnected to the vacuum chamber 25 and thereby further evacuate the chamber 25. This increase in the vacuum value in the chamber 25 causes the pneumatically operated device 42 to adjust the heat exchanger to increase the output temperature effect thereof to tend to increase the temperature sensed by the bimetal member 51.

At this time, the increase in the vacuum value in the chamber 25 causes the net force acting on the feedback diaphragm 21 to increase and thereby to pull the interconnection means 43 back downwardly to tend to close the valve member 57 against the valve seat 35 and thereby terminate the interconnection of the output chamber 25 with the vacuum source 33.

In this manner, the thermostat construction 10 tends to rebalance the system so that the device 42 is now held in a new position thereof to generate an output effect which will cause the bimetal member 51 to hold the valve member 57 against the valve seat 35.

Conversely, should the output temperature effect of the heat exchanger means exceed the setting of the set point adjuster 32, the bimetal member 51 will tend to move downwardly with a greater force to carry the interconnection means 43 therewith whereby the valve member 57 is lifted off of the opening 56 by the valve seat 35 being further projected through the opening 56 of the interconnection part 55 whereby air is now adapted to enter through the opening 56 and into the output chamber 25 to reduce the vacuum value thereof and thereby decrease the setting of the pneumatically operated device 42 to tend to reduce the output temperature effect of the heat exchanger means.

At this time, the decrease in the vacuum value in the output chamber 25 results in a reduction in the net feedback force acting across the feedback diaphragm 21 tending to move the interconnection means 43 downwardly so that the interconnection means 43 moves upwardly by the biasing force of the adjustment diaphragm 20 to again close the valve member 57 against the opening 56 to terminate the bleeding of air back into the output chamber 25 so that the system is again rebalanced.

Accordingly, it can be seen that for each temperature setting of the set point adjuster 32, the thermostat construction 10 tends to operate the pneumatically operated device 42 to tend to maintain the output temperature effect of the heat exchanger means at the temperature setting of the set point adjuster 32, the set point adjuster 32 initially pneumatically setting the thermostat construction 10 to a particular temperature setting thereof and the temperature sensing means 27 thereafter adjusting the pneumatically operated device 42 in accordance with deviations of sensed temperature from that temperature setting of the thermostat construction 10.

Also, since the balancing diaphragm 22 has the pressure differential across the same produce a biasing force opposite to the biasing force produced by the pressure differential acting across the feedback diaphragm 21 and since the feedback diaphragm 21 has the mean effective area thereof only slightly larger than the mean effective area of the balancing diaphragm 22, the feedback diaphragm 21 can be relatively large and still provide a very small net rebalancing force for the thermostat construction 10 for the reasons as previously set forth.

Therefore, it can be seen that this invention not only provides an improved thermostat construction 10, but also this invention provides an improved method of making such a thermostat construction or the like.

While the form and method of this invention now preferred have been described and illustrated as required by the Patent Statute, it is to be understood that other forms and method steps can be utilized and still fall within the scope of the appended claims.

What is claimed is:

1. In a thermostat construction for producing a pneumatic signal in relation to sensed temperature and having a housing means provided with a pneumatically operated set point adjustment diaphragm operatively interconnected to a temperature sensor and a pneumatically operated feedback diaphragm to control valve means for producing said pneumatic signal in an output chamber of said housing means that is defined in part by said feedback diaphragm, the improvement comprising a balancing diaphragm carried by said housing means and also defining in part said output chamber thereof, said balancing diaphragm being operatively interconnected to said feedback diaphragm.

2. A thermostat construction as set forth in claim 1 wherein said output chamber is defined in part between said balancing diaphragm and said feedback diaphragm.

3. A thermostat construction as set forth in claim 2 wherein said feedback diaphragm has a mean effective area exposed to said output chamber that is slightly larger than the mean effective area of said balancing diaphragm that is exposed to said output chamber.

4. A thermostat construction as set forth in claim 3 wherein a rigid interconnection means is operatively interconnected to all of said diaphragms and said sensor to move all of said diaphragms and said sensor in unison.

5. A thermostat construction as set forth in claim 4 wherein said interconnection means carries part of said valve means.

6. A thermostat construction as set forth in claim 4 wherein said diaphragms are operatively interconnected to said interconnection means in spaced stacked relation with said feedback diaphragm being intermediate said set point adjustment diaphragm and said balancing diaphragm.

7. A thermostat construction as set forth in claim 6 wherein said sensor is operatively interconnected to said interconnection means in stacked spaced relation to said diaphragms and outboard of said diaphragms.

8. A thermostat construction as set forth in claim 7 wherein said sensor is located outboard of and adjacent said balancing diaphragm.

9. A thermostat construction as set forth in claim 8 wherein said sensor is a bimetal member.

10. In a method of making a thermostat construction for producing a pneumatic signal in relation to sensed temperature and having a housing means provided with a pneumatically operated set point adjustment diaphragm operatively interconnected to a temperature sensor and a pneumatically operated feedback diaphragm to control valve means for producing said pneumatic signal in an output chamber of said housing means that is defined in part by said feedback diaphragm, the improvement comprising the steps of disposing a balancing diaphragm in said housing means to also define in part said output chamber thereof, and operatively interconnecting said balancing diaphragm to said feedback diaphragm.

11. A method of making a thermostat construction as set forth in claim 10 and including the step of defining said output chamber in part between said balancing diaphragm and said feedback diaphragm.

12. A method of making a thermostat construction as set forth in claim 11 and including the step of forming said feedback diaphragm with a mean effective area exposed to said output chamber that is slightly larger than the mean effective area of said balancing diaphragm that is exposed to said output chamber.

13. A method of making a thermostat construction as set forth in claim 12 and including the step of operatively interconnecting a rigid interconnection means to all of said diaphragms and said sensor to move all of said diaphragms and said sensor in unison.

14. A method of making a thermostat construction as set forth in claim 13 and including the step of forming said interconnection means to carry part of said valve means.

15. A method of making a thermostat construction as set forth in claim 13 and including the step of operatively interconnecting said diaphragms to said interconnection means in spaced stacked relation with said feedback diaphragm being intermediate said set point adjustment diaphragm and said balancing diaphragm.

16. A method of making a thermostat construction as set forth in claim 15 and including the step of operatively interconnecting said sensor to said interconnection means in stacked spaced relation to said diaphragms and outboard of said diaphragms.

17. A method of making a thermostat construction as set forth in claim 16 and including the step of locating said sensor outboard of and adjacent said balancing diaphragm.

18. A method of making a thermostat construction as set forth in claim 17 and including the step of forming said sensor from a bimetal member.

* * * * *